Nov. 4, 1941.                J. W. ATHEY ET AL                2,261,207
                              MIXING APPARATUS
                            Filed March 12, 1941            2 Sheets-Sheet 1
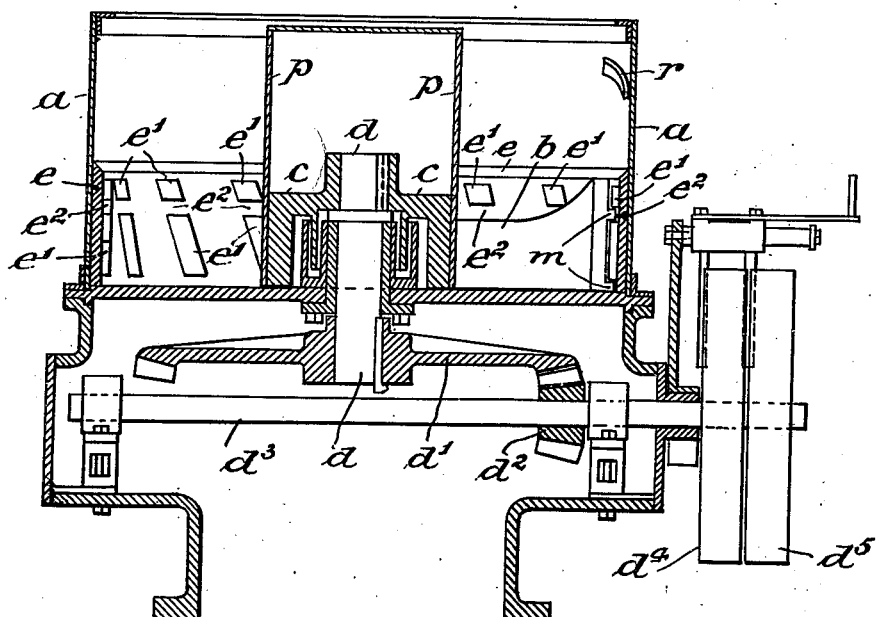
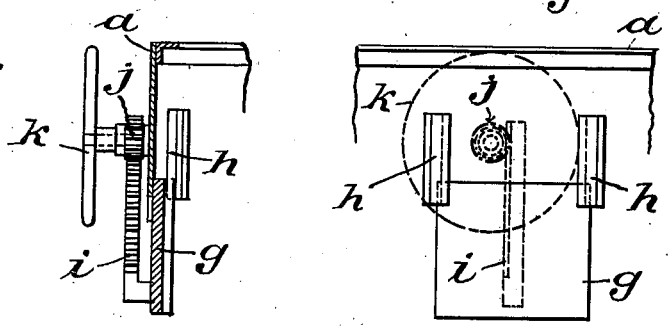

Patented Nov. 4, 1941

2,261,207

UNITED STATES PATENT OFFICE 2,261,207

MIXING APPARATUS

Joseph William Athey, Sutton Coldfield, and Arthur William Parsons, Tipton, England Application March 12, 1941, Serial No. 383,046
In Great Britain August 2, 1939

4 Claims. (Cl. 259—107)

The invention relates to apparatus particularly for mixing foundry sand with binding material to be used in the formation of cores, but applicable also for kneading dough or other plastic materials.

The invention has for its object to provide mixing apparatus which will effect a more intimate mixture of sand and binding material, or a more effective kneading action, than any of the known forms of apparatus and will, moreover, effect such mixture or kneading in a shorter time than hitherto for a given batch or quantity of material.

The invention is characterised in that a vertical pan or hopper, of cylindrical section and open or capable of being opened at its upper end, and having rotatable within it a series of pressure blades carried by a vertical driven shaft extending axially upwards within the pan, such pressure blades being spaced at intervals circumferentially of the shaft and being appropriately curved to cause the sand mixture contained in the pan to be pressed outwardly, as the shaft is rotated, towards the periphery of the pan, has the interior surface of the vertical wall of the pan furnished with inwardly-projecting ribs spaced apart circumferentially at suitable intervals such ribs being preferably inclined or of helical form and leaning or extending forwardly as it were in the direction of rotation of the blades.

The inwardly-projecting ribs are preferably interrupted or recessed at one or more places in their depth and the extremities of the pressure blades provided with projections adapted to extend into and sweep through the gaps or recesses as the blades revolve.

The pressure blades are preferably provided with renewable tips or end pieces of appropriate shape.

A suitably-controlled discharge outlet or outlets is or are provided in the lower part of the vertical wall of the pan, through which outlet or outlets, when opened up, the mixture in the pan will be discharged by the action of the pressure blades.

In the accompanying drawings,

Fig. 1 is a sectional elevation of a preferred embodiment of a mixing machine according to the invention;

Figs. 3 and 4 show, in vertical section and inner elevation respectively, a suitable form of discharge door and means for operating the same.

Figure 2:
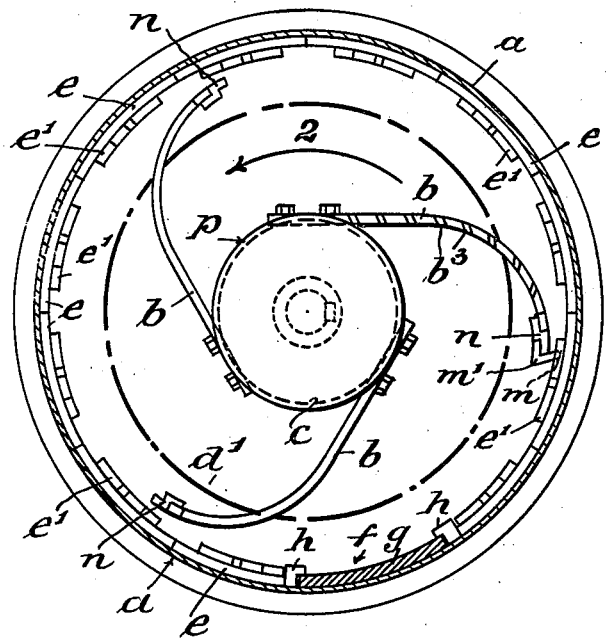
Fig. 2 is a partial plan view.

Referring to the drawings, $a$ represents a vertical pan or hopper of cylindrial section and open at its upper end. Rotatable within the pan are a series, in this instance three in number, of pressure blades $b$ carried by and extending tangentially from a block $c$ fast on a vertical shaft $d$ extending axially upwards within the pan and shown as being driven by bevels $d'$, $d^2$, shaft $d^3$, and fast and loose pulleys $d^4$ and $d^5$.

The pressure blades $b$ are spaced apart circumferentially and are appropriately curved rearwardly, as shown, at their outer ends to cause the sand mixture contained in the pan to be pressed outwardly towards the periphery of the pan, as the shaft $d$ is rotated in the direction of the arrow 2 in Fig. 2. The diameter of the circle traversed by the extremities of the blades (with the exception of one of them as described later) is somewhat less, as shown in Fig. 2, than the internal diameter of the pan, and the lower edges of the blades are located as closely as is practicable to the bottom of the pan.

The interior surface of the vertical wall of the pan is lined around its lower part with segments $e$ furnished with inwardly-projecting ribs $e'$ which are preferably inclined forwardly, as shown in Fig. 1, in the direction of the rotation of the blades.

When the sand and binding material, or the other materials to be mixed, are placed in the pan and the blade shaft is rotated, the action of the pressure blades causes the material to be forced outwardly towards the periphery of the pan and to be squeezed as it were through a series of gradually-narrowing pockets or spaces.

As the mixture is pressed against the vertical wall of the pan the combined action of the outward pressure exerted by the blades and of the inclined or helical ribs $e'$, causes the mixture to climb, as it were up the paths constituted between adjacent pairs of ribs, and then to fall back inwardly on to the top of the material beneath it. The material thus receives, in addition to the rubbing pressure exerted by the blades, a kind of upward, forward and inward churning action which ensures that the whole of the contents of the pan are quickly and properly acted upon.

At an appropriate point or points in the lower part of the vertical wall of the pan a discharge outlet is provided. The outlet is shown as being controlled by a door $g$ slidable between vertical guides $h, h$, on the inner side of the pan wall. A toothed bar or rack $i$ carried by the door $g$ is engaged by a pinion $j$ fast on the shaft of a hand wheel $k$. When the mixing operation is complete, opening up of the outlet $f$ permits the moving blades to effect discharge of the mixture from the pan.

In order to obviate any tendency for the mixture to adhere to the pan wall between adjacent pairs of the inclined or helical ribs $e'$, the ribs are preferably interrupted or recessed as at $e^2$ and the extremity of one of the pressure blades is provided with projections $m$ adapted to extend into and sweep through the said gaps or recesses as the blades revolve. Thus, when the pan is being emptied and the level of mixture in it is falling, the sweeping of the projections $m$ through the gaps or recesses of the ribs $e'$ will cut through any mixture which may tend to adhere to the pan wall and cause it to be dislodged.

The extremity of each presure blade is preferably provided with a suitably-secured renewable wearing piece $n$ and the projections $m$ be fashioned on a plate $m'$ secured to the appropriate wearing piece.

If desired, auxiliary inclined or curved blades may be provided intermediate the pressure blades to assist in promoting outward movement of the material towards the wall of the pan. Also, if desired, the leading faces of the pressure blades, which exert pressure on the material, may be provided with suitably inclined or curved ribs and the upper edge of each blade may be serrated as shown at $b^2$ in Fig. 5 or be provided with upstanding projections or inclined vanes as indicated at $b^3$ in Fig. 2.

The block $c$, to which the inner ends of the pressure blades are secured, is preferably surrounded by a sleeve $p$ which extends substantially to the upper end of the pan.

If desired, inwardly curved plates such as $r$ may be provided towards the upper end of the pan wall for the purpose of turning inwardly any material which may tend to rise too high without falling over on to the material beneath it.

Figure 5:
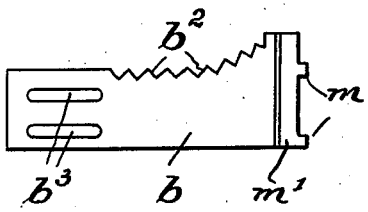
Figs. 5 shows, detached, one of the pressure blades.

The pressure blades may, if desired, be so constructed as to be capable of yielding in the event of their meeting with undue obstruction to movement. To this end each blade might be made in two parts pivoted together and maintained in normal position either by a spring or by a shearing pin. Provision is also preferably made for varying the effective length of the pressure blades and this may conveniently be done by providing each blade with elongated slots $b_3$ as indicated in Fig. 5, for the passage of set screws by which the blades are secured to the block $c$.

Having thus described our invention, what we claim as new and desire to secure by Letters Patent is:

1. Mixing apparatus comprising a cylindrical hopper, a driven member axially extended vertically thereinto and rotatable therein, a series of blades connected at their inner ends to said member and extending at their outer ends proximate the hopper wall, the outer ends of the blades being rearwardly curved relative to their direction of rotation, said hopper wall having thereon a series of vertically arranged circumferentially spaced ribs inclined upwardly and forwardly in the direction of rotation of the blades and extending substantially the full height of the blades, and said ribs being spaced apart sufficiently to provide relatively wide unobstructed channels therebetween.

2. Mixing apparatus comprising a cylindrical hopper, a rotatable driven member axially extended thereinto, a circumferential series of blades carried by said member with their outer ends terminating appreciably radially inwardly of the hopper wall and curved rearwardly relative to their direction of rotation, said hopper wall having thereon a circumferentially spaced series of ribs running axially of the hopper and inclined forwardly in the direction of blade rotation, said ribs being spaced sufficiently to provide relatively wide unobstructed channels therebetween and being longitudinally interrupted to provide gaps therein, and the end of at least one of said blades having lateral projections thereon adapted to sweep through the rib gaps and channels in close proximity to the hopper wall as the blades are rotated.

3. Mixing apparatus as in claim 2, in which said projections are carried by a wear plate detachably secured to the blade end.

4. Mixing apparatus as in claim 1, in which the upper edge of each blade is provided with a substantially toothed portion.

JOSEPH WILLIAM ATHEY.
ARTHUR WILLIAM PARSONS.